June 26, 1934.  G. E. PLATZER  1,964,532

AUTOMOTIVE VEHICLE TEST EQUIPMENT

Filed Oct. 1, 1928

Inventor:
George E. Platzer,
by Charles E. Mullan
His Attorney.

Patented June 26, 1934

1,964,532

UNITED STATES PATENT OFFICE 1,964,532

AUTOMOTIVE VEHICLE TEST EQUIPMENT

George E. Platzer, Schenectady, N. Y., assignor to General Electric Company, a corporation of New York Application October 1, 1928, Serial No. 309,510

13 Claims. (Cl. 73—51)

My invention relates to testing equipment for automotive vehicles, and the like, and has for its object the provision of a simple, convenient and reliable arrangement for testing the performance of a motive vehicle while subjecting the vehicle to conditions simulating those encountered in actual road service.

In the design of automotive vehicles, it is desirable to carefully investigate the operating performance of the vehicle as to its accelerating ability, its hill climbing ability, its speed and its decelerating ability. Heretofore such tests have been made by actually causing a number of sample cars to perform upon the road. This method at its best is not only very costly but is very apt to produce inaccurate results, because of the great difficulty inherent in such a method of detecting and recording the changes that occur in the response of the vehicle when subjected to certain tests.

In one of its aspects, my invention contemplates the provision of testing equipment for automotive vehicles whereby with the vehicle in a stationary position it will be subjected to conditions simulating those actually experienced by the vehicle upon the road, including hill climbing and coasting as well as running on the level and further whereby the action of the vehicle in response to these tests will be accurately detected and reproduced.

In carrying my invention into effect in one form thereof, I provide apparatus constituting in effect endless tracks for the wheels of the vehicle so arranged that the vehicle while in a stationary position may either drive the endless tracks or be driven thereby so that the various grades of an actual road may be simulated. Recording means responsive to the movement of the vehicle wheels are provided so as to produce graphically records indicative of the speeds of the vehicles. Because every moving vehicle possesses a certain amount of inertia, I further provide inertia bodies proportioned to be equivalent to the inertia of the vehicle itself and arrange the bodies to be driven in accordance with the rotation of the vehicle wheels.

Figure 1:
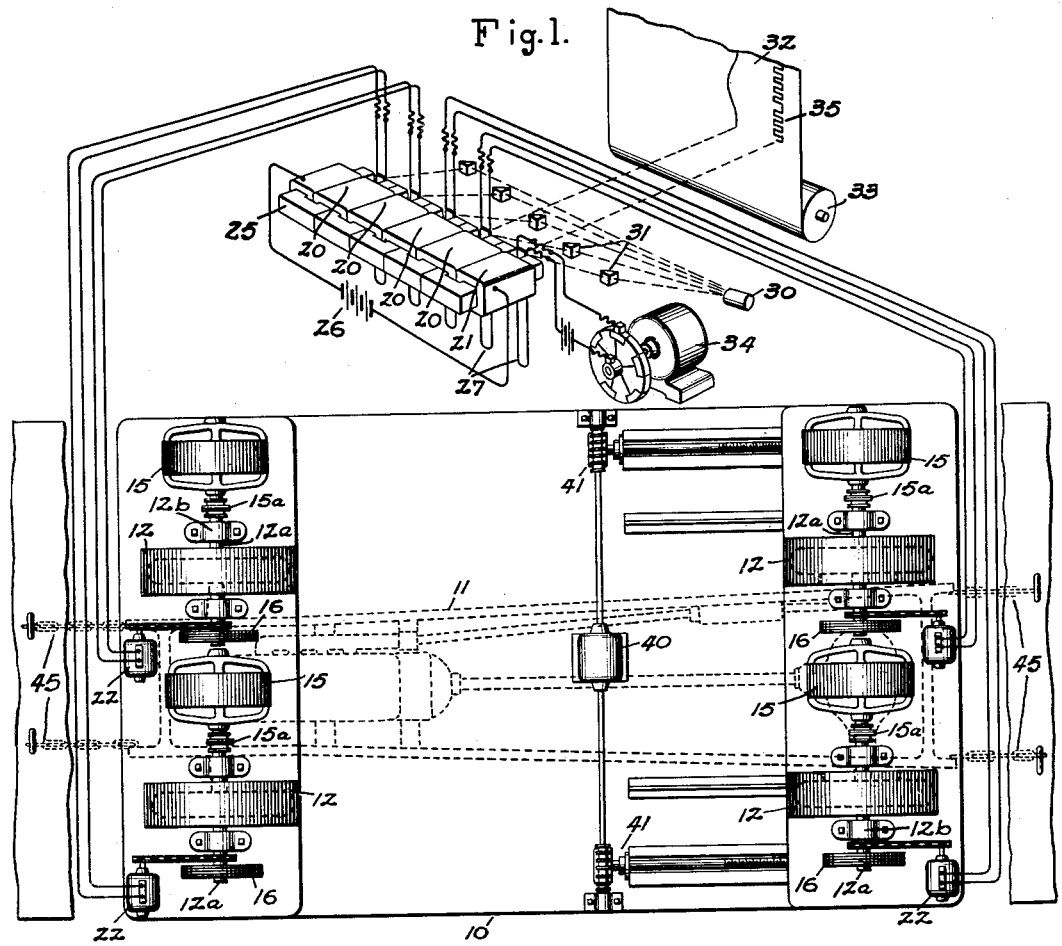
Figure 2:
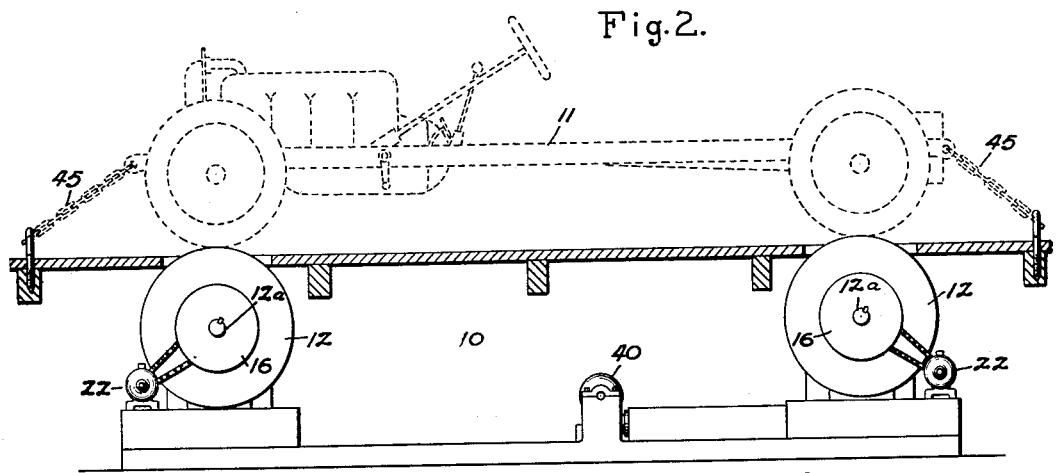

For a more complete understanding of my invention reference should be had to the accompanying drawing in which Fig. 1 is a view illustrating automotive testing equipment embodying my invention and further illustrating by dotted lines the position of the vehicle to be tested relative to the testing equipment; and Fig. 2 is an elevation illustrating a portion of the testing equipment with an automotive vehicle, illustrated by dotted lines, locked in position ready for the test.

Referring to the drawing, I have shown my invention in one form as applied to testing equipment for automobiles. As shown, the testing equipment 10 provided for testing the automobile 11 comprises four traction drums 12, one drum being provided for each of the four wheels of the automobile. Each of the drums 12 is mounted upon a suitable drum shaft 12a rotatably mounted in a stationary supporting standard 12b. Thus each drum constitutes an endless track for its associated wheel.

It will be understood that since it is desired to test the automobile in a stationary position, the drums must constitute in effect an endless road for the vehicle and further must be so controlled that they may cause conditions to exist simulating those actually experienced by the vehicle when travelling upon a road. Thus, assuming that it is desired to test the performance of the vehicle when running upon a level road, the drums would be driven by the wheels of the automobile; should it be desired to test the performance of the vehicle in climbing a hill, a load would be applied to the drums proportionate to the degree of slope; and should it be desired to test the performance of the vehicle with respect to its braking equipment, particularly in going down hill, the drums would be driven at a suitable speed.

In order that various loads may be applied to the drums and further in order that the drums may be rotated at various speeds in accordance with the requirements of the tests referred to above, suitable dynamometer apparatus is provided. It will be understood that the dynamometer apparatus may be of any desired form either mechanical or electrical. For purposes of description I have provided dynamometers of the electrical type.

As shown, four suitable dynamo-electric machines 15 are provided, a machine 15 being directly connected to each of the drums. The machines 15 may be either operated as generators or as motors. That is, they may be driven by the drums 12 so as to impose a retarding load upon the motive means of the automobile or they may be operated as motors from a suitable electrical supply source (not shown) so as to exert a rotational driving force upon the drums. Suitable clutches 15a are provided so that the machines 15 may be disconnected from the drums as desired.

It will be understood that when an automotive vehicle is moving along a road it possesses a certain amount of inertia and in order that the influence of the inertia of the vehicle may be indicated in the test, suitable weights 16 are mounted upon each of the drum shafts 12a so as to rotate with the corresponding drum.

It will be understood that these weights will be proportioned suitably to the various tests to be made. For instance, if the accelerating ability of the vehicle under its own motive power is being observed the weights 16 connected to be driven by the rear wheels will be proportioned so that their inertia will be equivalent to that of the vehicle itself when being moved as a body. It will be understood that the two rear wheels alone will be driven by the motive power means during its accelerating tests and so it is necessary to so proportion the rear weights 16. On the other hand, if the braking performance of the vehicle under the influence of four wheel braking mechanism is being observed, the weights 16 will be suitably proportioned so that the kinetic energy to be absorbed in reducing the vehicle speed will be divided between the front and rear brakes in the proper proportionality. Of course, if the vehicle is being braked by the rear brakes alone, the rear weights 16 will be accordingly proportioned.

It will be understood that the results of the various performance tests of the vehicle, referred to above, in order to be of commercial value must be recorded in some permanent manner and further must indicate the slightest changes in the performance of the vehicle in response to the tests imposed. The sensitiveness of the recording apparatus becomes of increasing importance because of the almost daily improvements in automotive vehicles. For instance the introduction of the four-wheel brakes has greatly complicated the problem of testing the performance of a vehicle as to its braking both at high and low speeds. It will be appreciated that a car moving at a low speed, as for example four or five miles per hour, stops almost instantly under the full application of the four-wheel brake mechanisms. And thus, it becomes practically an impossibility to determine and record accurately the vehicle brake performance by methods heretofore in practice. High speed tests, that is tests at operating speeds of fifty or sixty miles per hour, likewise introduce such difficulties that the former testing methods have proven inadequate.

In order to accurately secure and record the action of the vehicle in response to the various tests, I provide apparatus to be used in connection with a sensitive recording instrument, as for instance, a suitable oscillograph.

The oscillographs, indicated diagrammatically in the upper portion of the drawing are standard instruments well understood in the electrical arts, for producing and for recording images representing the fluctuations from instant to instant of electric currents. The images may be produced by the tracing of a point of light upon a ground glass or in a mirror, or the images may be recorded permanently on a photographic film. Oscillographs of the character referred to are well-known in the electrical art and are set forth and claimed, for example, in the U. S. patent to L. T. Robinson No. 919,467, dated April 27, 1909.

As shown, the oscillograph comprises four units 20, each one of which is caused to respond to movements of one of the test drums 12, and a fifth unit 21 which is operated so as to indicate elapsed time. Thus, since each one of the four units 20 is controlled by the motion of its associated drum 12 and since the fifth unit 21 is controlled to indicate elapsed time, the speed of any one of the drums may be directly read from the curves that will be traced by the oscillographs, and may be compared with elapsed time to determine the acceleration or deceleration.

In order that the oscillographs may be operated so as to respond to the rotation of the drums, suitable generators 22 are electrically connected to the respective units of the oscillograph each of the generators 22 being driven from one of the drum-shafts 12a. Any suitable means may be provided for operably connecting the generators to the jackshafts. As shown, suitable chain drives are provided for this purpose.

The field magnets of the oscillographs are indicated by the ordinals 25, the field magnets receiving current from any suitable source of direct current supply, shown as a battery 26. For each of the magnets 25, there is a bifilar suspension 27 which carries as usual a small mirror. Light from a suitable source such as an arc lamp, not shown, is transmitted by a lens 30 and prisms 31 to these mirrors, and reflected in turn to a suitable receiving surface, shown as a photosensitive film 32. A suitable drum 33 is provided for moving the photosensitive film at a suitable constant speed.

The bifilar circuits 27 of the oscillograph are connected respectively to the circuits of the generators 22, and the position of the mirrors carried thereby upon its vertical axis will depend upon the voltage impressed upon the bifilar circuits by the generators so that as the generator voltage increases the angle of deflection of the mirrors from their normal central positions will be increased and conversely as the generator voltage decreases the angle of deflection of the mirrors will be decreased. Thus, as the voltage which is responsive to the speed of the drums 12 varies, the deflection of the mirrors will vary accordingly to indicate by the line traced thereby upon the receiving film 32, the drum speed variations and consequently the vehicle speed variations. It will be understood that the timing motor 34 operates the oscillograph unit 21 so as to cause it to indicate seconds or fractions thereof by proper spaces 35 traced on the photosensitive film. It will be further understood that the unit 21 may be caused to space off revolutions of the vehicle wheels rather than seconds if so desired.

Suitable adjusting means are provided so as to accommodate the test stand to vehicles of various wheel bases. As shown, one pair of drums is so mounted that it may be moved longitudinally with respect to the other pair. A suitable motor 40 operating through the worm drive 41 is provided to operate this set of testing drums to its desired longitudinal position.

As thus constructed and arranged the operation of my invention is as follows: Let it be assumed that the vehicle to be tested is placed in proper position upon the test stand, that is, in such a position that the four vehicle wheels are properly positioned upon the drums 12, i. e., rest upon the uppermost points of the drums. It will be understood that the vehicle will be securely locked in this position by any suitable means. As shown, suitable chains 45 fastened securely to the vehicle and locked to the test stand are provided for this purpose.

In order to test the performance of the vehicle when operated under its motive power, the engine or other driving means of the vehicle will be started. The engine will then be connected to the driving wheels of the vehicle in the usual manner through the various speed shifts. It will be observed that the drums and inertia bodies 16 associated with the driving wheels of the vehicle will be rotated at speeds dependent upon the speeds of the driving wheels. The drums in turn will operate the associated generators 22, which will cause the oscillographs to trace the corresponding speed curves. Thus, curves showing the acceleration of the car through the various speed shifts will be obtained.

It will be understood that the dynamo-electric machines 15 may be either operated as generators or motors. The machines when operating as generators may be loaded in any suitable manner, as by dynamic or regenerative braking, the imposed loads likewise being indicated in any suitable manner. Thus, the vehicle may be subjected to conditions simulating operation upon roads of varying grades or simulating operation under varying loads. The load upon the generators may be increased to such a value that the engine will begin to slow down under the excessive load and thus the maximum load that the engine will carry before the car will begin to decelerate will be determined, the curves accurately reproducing the slightest changes in speed. By throwing out the clutches 15a and suddenly applying the brakes the deceleration curve for each wheel showing the individual braking effect thereof will be obtained.

Should it be desired to obtain the decelerating curves for each wheel under the influence of a four-wheel brake mechanism, the machines 15 will be caused to operate as motors. Thus, the drums and associated weights 16, providing for the inertia effect of the vehicle may be rotated at any desired speed. After the drums have been brought up to the desired speed the clutches 15a will be thrown out and the drums brought to rest under the influence of the brakes. Thus, four speed curves will be traced so as to indicate the individual braking effect of the wheels.

It will be observed that my testing apparatus will accurately reproduce and graphically record the performance of a vehicle while subjected to conditions simulating those actually encountered upon the road. Its acceleration through the various speed shifts, its hill climbing ability, its speed, its load drawing capacity and its decelerating ability under various types of brake equipment may all be readily determined and graphically recorded.

While I have described my invention as embodied in concrete form and operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. Apparatus for testing the accelerating ability, the decelerating ability and speed of an automotive vehicle and the like with the vehicle in a stationary position comprising a plurality of separate moving tracks operably associated with the wheels of said vehicle respectively so that said tracks can be driven by said wheels, means for driving each of said tracks independently of the remainder of said tracks so that motion can be imparted to each wheel independently of the remainder of said wheels, inertia bodies connected with said tracks for applying an inertia effect thereto equivalent to the inertia of said vehicle and recording means electrically responsive to the operation of said moving tracks for producing graphic records indicative of the respective speeds of said wheels.

2. Apparatus for testing the performance of automotive vehicles and the like comprising a plurality of electric generators, one provided for each of the driving wheels of said vehicle and arranged to be operated in synchronism therewith, an electric circuit controlled by each of said generators, a recording sheet and means responsive to the magnitude and direction of the currents flowing in said circuits for simultaneously producing on said record sheet graphic records indicative of the respective velocities of said driving wheels, said means being further arranged to produce graphic records on said sheet indicative of elapsed time.

3. Apparatus for testing the performance of automotive vehicles and the like comprising traction drums upon which the wheels of the vehicle rest so as to form a driving connection therewith, a plurality of electric generators, one provided for each of the wheels of said vehicle and arranged to be driven by said traction drums, an electric circuit controlled by each of said generators, a recording sheet and means responsive to the magnitude and direction of the currents flowing in said circuits for simultaneously producing on said record sheet graphic records indicative of the respective speeds of said wheels.

4. Apparatus for testing the performance of automotive vehicles and the like with the vehicle in a stationary position comprising endless tracks operably associated with the wheels of said vehicle, inertia bodies proportioned to be equivalent of the inertia of said vehicle operably connected with said endless tracks, and means for applying torques to said endless track so as to retard the motion of said tracks under certain conditions of operation and to drive said tracks to impart motion to said wheels under other conditions of operation whereby the vehicle is subjected to conditions simulating those encountered in actual road service.

5. Apparatus for testing the performance of automotive vehicles and the like with the vehicle in a stationary position comprising endless tracks operably associated with the wheels of said vehicle, inertia bodies proportioned to be equivalent of the inertia of said vehicle operably connected with said endless tracks, means for applying torques to said endless tracks so as to retard the motion of said tracks under certain conditions of operation and to drive said tracks to impart motion to said wheels under other conditions of operation whereby said vehicle is subjected to conditions simulating those encountered in actual road service and means responsive to the operation of said endless tracks arranged to indicate the respective speeds of said wheels.

6. An automotive testing equipment or the like comprising traction drums upon which the wheels of the vehicle rest so as to form a driving connection therewith, separate means connected to drive each of said drums or to exert a retarding influence thereon whereby said vehicle is subjected to conditions simulating those encountered in actual road service, separate bodies connected to apply an inertia effect to each of said drums the combined inertia of said separate bodies being equivalent to the inertia of the vehicle and means for adjusting the relative inertia of said bodies.

7. An automotive vehicle testing equipment or the like comprising traction drums upon which the wheels of the vehicle rest so as to form a driving connection therewith, separate dynamo-electric machines connected to drive each of said drums or to exert a retarding influence thereon whereby said vehicle is subjected to conditions simulating those encountered in actual road service, separate means for applying an inertia effect to each of said drums, the combined inertia of said separate means being equivalent to the inertia of the vehicle, means for adjusting the relative inertia of said separate means, and means responsive to the operation of said drums for indicating the speeds of said wheels.

8. Apparatus for testing the acceleration, deceleration and speed of automotive vehicles and the like comprising traction drums upon which the wheels of said vehicle rest so as to form an endless road therefor, a motor dynamometer for each traction drum arranged to drive said drum or to be driven thereby so as to subject the vehicle to conditions simulating those encountered in actual road service, inertia bodies proportioned so as to be equivalent to the inertia of the vehicle itself operably associated with said traction drums and recording means responsive to the rotation of said drums for producing graphic records indicative of the speeds of said wheels.

9. An apparatus for testing the performance of automotive vehicles and the like comprising traction drums upon which the wheels of said vehicle rest so as to form endless tracks therefor, a motor dynamometer for each traction drum arranged to drive said drum or to be driven thereby so as to subject the vehicle to conditions simulating those encountered in actual road service, inertia bodies proportioned so as to be equivalent to the inertia of the vehicle operably associated with said traction drums and means for disconnecting said motor dynamometers whereby said drums may be rotated under the influence of said inertia bodies.

10. Apparatus for testing the performance of automotive vehicles and the like comprising a plurality of separate rotative tracks on which the respective wheels of the vehicle are adapted to rest to form driving connections therewith, a plurality of separate inertia bodies connected to said tracks respectively, means for adjusting the inertia effect of each of said bodies, separate electroresponsive members arranged to apply retarding torques to the respective tracks under certain conditions of operation so that loads can be imposed on the driving wheels of said vehicle to impose a load on the impelling means provided therefor and under other conditions of operation to apply driving torques to said driving wheels to assist said impelling means in driving said wheels, and further, under still other conditions of operation to drive said drums to impart motion to said inertia bodies to store up energy for subsequent use in driving said tracks and their associated wheels and means for disconnecting said electroresponsive means from their associated tracks.

11. Apparatus for testing the acceleration, deceleration and speed of an automotive vehicle and the like comprising traction drums upon which the wheels of the vehicle rest so as to form a driving connection therewith, a plurality of electric circuits, one for each of said drums, sources of electromotive forces for said circuits, means controlling said electromotive forces in accordance with the rotation of said drums so that the magnitudes of the currents flowing in said circuits are caused to vary in accordance with the speeds of said drums and recording means including a recording sheet, means responsive to the magnitudes of the currents flowing in said circuits for simultaneously producing on said recording sheet graphic records indicative of the respective speeds of said drums and means for producing a graphic record on said sheet indicative of elapsed time.

12. Apparatus for testing the performance of automotive vehicles and the like comprising a plurality of rotatable tracks on which the wheels of said vehicle are adapted to rest to form a driving connection therewith, separate means for applying torques to each of said rotatable tracks independently of the remainder thereof so as to retard the motion of the associated track under certain conditions of operation and to drive said track to impart motion to the wheel associated therewith under other conditions of operation, and second separate means for applying an inertia effect to each of said rotatable tracks, the combined inertia effect of said separate means being equivalent to the inertia of said vehicle.

13. Apparatus for testing the performance of automotive vehicles and the like comprising a plurality of rotatable tracks on which the wheels of said vehicle are adapted to rest to form a driving connection therewith, separate electroresponsive means for applying torques to each of said rotatable tracks independently of the remainder thereof so as to retard the motion of the associated track under certain conditions of operation and to drive said track to impart motion to the wheel associated therewith under other conditions of operation, second separate means for applying an inertia effect to each of said rotatable tracks, the combined inertia effect applied to said tracks being equivalent to the inertia of said vehicle, means for controlling said inertia effect applying means so as to adjust the relative inertia applied to said tracks and means responsive to the operation of said rotatable tracks for indicating graphically the speeds of said wheels.

GEORGE E. PLATZER.